United States Patent
Spritzer et al.

(10) Patent No.: US 6,709,602 B2
(45) Date of Patent: Mar. 23, 2004

(54) PROCESS FOR HYDROTHERMAL TREATMENT OF MATERIALS

(75) Inventors: Michael H. Spritzer, San Diego, CA (US); William S. Rickman, Encinitas, CA (US); Niles W. Johanson, San Diego, CA (US); Glenn T. Hong, Westborough, MA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/841,058

(22) Filed: Apr. 23, 2001

(65) Prior Publication Data

US 2002/0179541 A1 Dec. 5, 2002

(51) Int. Cl.$^7$ .................................................. C02F 1/20
(52) U.S. Cl. ..................... 210/750; 210/761; 588/208; 588/209; 588/213; 588/216; 588/220; 588/226; 588/228
(58) Field of Search ............................. 210/749, 750, 210/752, 761, 762, 757; 422/105, 109, 184.1, 242; 588/208, 209, 213, 216, 220, 226, 228

(56) References Cited

U.S. PATENT DOCUMENTS

| | | | |
|---|---|---|---|
| 2,944,396 A | * | 7/1960 | Barton et al. ............... 210/763 |
| 3,804,756 A | * | 4/1974 | Callahan et al. ............ 210/763 |
| 4,179,263 A | * | 12/1979 | Jung et al. .................. 106/745 |
| 4,261,795 A | * | 4/1981 | Reilly ......................... 110/257 |
| 4,338,199 A | | 7/1982 | Modell |
| 4,543,190 A | | 9/1985 | Modell |
| 4,822,497 A | | 4/1989 | Hong |
| 5,100,560 A | | 3/1992 | Huang |
| 5,200,093 A | | 4/1993 | Barner |
| 5,205,906 A | * | 4/1993 | Grutsch et al. ............ 159/47.3 |
| 5,240,619 A | * | 8/1993 | Copa et al. .................. 210/752 |
| 5,252,224 A | | 10/1993 | Modell |
| 5,387,398 A | | 2/1995 | Mueggenburg |
| 5,427,764 A | | 6/1995 | Barber |
| 5,543,057 A | | 8/1996 | Whiting |
| 5,562,834 A | * | 10/1996 | Bremer et al. .............. 210/750 |
| 5,602,297 A | * | 2/1997 | Wang ......................... 588/207 |
| 5,674,405 A | | 10/1997 | Bourhis |
| 5,746,926 A | * | 5/1998 | Ross et al. .................. 210/761 |
| 5,891,345 A | * | 4/1999 | Bremer et al. ............. 159/47.3 |
| 6,054,057 A | | 4/2000 | Hazlebeck |
| 6,238,568 B1 | | 5/2001 | Hazlebeck |
| 6,376,738 B1 | * | 4/2002 | Kashiwagi et al. ......... 423/497 |
| 6,551,517 B1 | * | 4/2003 | Sentagnes et al. .......... 210/719 |

* cited by examiner

*Primary Examiner*—Peter A. Hruskoci
(74) *Attorney, Agent, or Firm*—Nydegger & Associates

(57) ABSTRACT

A system and method for treating feedstocks containing solids, sludges or slurries that contain organics includes introducing the feedstock into a desorption chamber. In the desorption chamber, the temperature and pressure of the feedstock are elevated to volatilize a portion of the feedstock and thereby separate the feedstock into a volatile portion containing organics and a residue portion. Steam, water or oxidants can be injected into the desorption chamber to aid in the volatilization process. From the desorption chamber, the volatile portion of the feedstock is transferred to a reactor for hydrothermal treatment to oxidize or reform the organics in the volatile portion. In the hydrothermal reactor, the volatile portion may be reacted with excess oxidant and auxiliary fuel at a temperature between approximately 1000° F. and approximately 1800° F. and a pressure of between approximately 20 atmospheres and approximately 200 atmospheres.

8 Claims, 2 Drawing Sheets

PROCESS FOR HYDROTHERMAL TREATMENT OF MATERIALS

FIELD OF THE INVENTION

The present invention pertains generally to methods and systems for accomplishing hydrothermal treatment for the purposes of either waste destruction, energy generation, or the production of chemicals. More specifically, the present invention pertains to methods and systems for the hydrothermal treatment of solids having organic constituents. The present invention is particularly, but not exclusively, useful as a method and system for volatilizing a portion of a material and subsequently treating the volatilized portion hydrothermally.

BACKGROUND OF THE INVENTION

The present invention pertains to a process for converting materials at supercritical temperature and pressure conditions, or at supercritical temperatures and elevated, yet subcritical, pressures. Supercritical and subcritical are defined here with reference to the critical point of pure water, 705° F. and 218 atm. For example, U.S. Pat. No. 4,338,199, which issued on Jul. 6, 1982 to Modell, discloses a hydrothermal process known as supercritical water oxidation (SCWO) because in some implementations oxidation in the aqueous/steam matrix occurs essentially entirely at conditions supercritical in temperature and pressure. The SCWO process has been shown to give rapid and complete oxidation of virtually any organic compound in a matter of seconds at 1000–1250° F. and 250 atm.

Under SCWO conditions, carbon and hydrogen form the conventional combustion products $CO_2$ and $H_2O$, while chlorinated hydrocarbons (CHC's) give rise to hydrochloric acid (HCl). If cations are available, they will react with the hydrochloric acid to form chloride salts. Alkali may be intentionally added to the reactor to avoid high, corrosive concentrations of hydrochloric acid in the reactor and especially in the cooldown equipment following the reactor. One advantage of the SCWO process is that the conversion of material can be accomplished without producing the environmentally harmful by-products that are produced when the same material is combusted in air. For example, the final product of sulfur oxidation in SCWO is sulfate anion, in contrast to normal combustion, wherein sulfur oxidation forms gaseous $SO_2$. As in the case of chloride, alkali may be intentionally added to avoid high concentrations of sulfuric acid. Similarly, the SCWO product of phosphorus oxidation is phosphate anion.

A hydrothermal process related to SCWO known as supercritical temperature water oxidation (STWO) can provide similar oxidation effectiveness for certain feedstocks but at lower pressure. This process has been described in U.S. Pat. No. 5,106,513 issued Apr. 21, 1992 to Hong, and utilizes temperatures in the range of 1200° F. and pressures between 25 and 218 atm. Like SCWO, the overall goal of the process may be waste destruction, energy generation, or production of chemicals. For convenience, the processes of SCWO and STWO will both be referred to herein as hydrothermal oxidation (HTO).

A key advantage of the hydrothermal processes described above is the cleanliness of the liquid and gaseous effluents. In particular, the gaseous emissions are far cleaner than those obtained by the conventional practice of incineration. EPA's Maximum Achievable Control Technology (MACT) standards for hazardous waste incineration took effect on Sep. 30, 1999. Current operating facilities were given until Mar. 31, 2003 to comply with the regulations. New facilities are required to comply with the new regulations at start-up. Table 1 shows that HTO emissions meet the MACT standards with little or no post-treatment, while incinerators require extensive emissions cleanup.

TABLE 1

Comparison of Incineration and HTO with Respect to MACT/Air Standards

| Type of Emissions in Effluent Gas Stream | MACT/Air Standards | Typical incinerator emissions controls needed to meet new MACT Standards | HTO Inherent Performance (with no gas cleanup devices) |
|---|---|---|---|
| Dioxins/difurans, ng/DSCM (TEQ) | <0.2 | Rapid quench, powdered activated carbon (PAC) with fabric filter baghouse | <0.006 |
| Particulate Matter, mg/DSCM | <34 | Fabric filter baghouse or electrostatic precipitator | <4 |
| Toxic Metals, mg/DSCM | <0.024 for Cd + Pb <0.097 for Sb + As + Be + Cr | Wet electrostatic precipitator | <0.015 for Cd + Pb <0.015 for Sb + As + Be + Cr |
| Destruction and removal efficiency, % | >99.99 | Afterburner | >99.999 |
| HCl, ppmv | <21 | Packed tower wet scrubber | <0.4 |
| NOx, ppm | depends on air district - can be <100 ppm | Only local regulations apply. Ammonia or urea injection may be required. | <1 |
| CO, ppm | <100 | Afterburner | <2 |
| Hydrocarbons, ppm | <10 | Afterburner | <0.03 |

A useful variation on the HTO process is that in which no oxidant, or a sub-stoichiometric amount of oxidant, is added to the reactor. In this case, rather than converting to $CO_2$ and $H_2O$, the organic material can reform into useful organic products. This process will be referred to as hydrothermal gasification (HTG), while HTO and HTG will be jointly referred to as hydrothermal processing (HTP).

A conventional limitation of HTP has been its application to bulk solids. The pressurized nature of the process typically requires that bulk solids be ground to a fine particle size to allow pumping into a high pressure reactor. Both grinding and pumping can require specialty equipment. In particular, a different device is generally required for different materials such as wood, plastic, or friable solids. Once the material has been ground, introduction into a pressurized reactor usually requires slurrying the material at a high concentration to minimize the size of the HTP reactor and associated process equipment. Thus, expensive, high pressure slurry pumps for viscous streams are typically required. For other solids such as metals, glass or ceramics, suitable size-reduction for introduction into an HTP reactor vessel is completely impractical.

A large amount of hazardous waste is generated each year that cannot be placed in a typical landfill unless it is pre-treated. Among this hazardous waste is a large amount of mixed waste consisting of non-hazardous solids that are contaminated with hazardous constituents. The hazardous constituents in these mixed-waste streams are generally suitable for direct feeding into a HTP reactor if they can be first separated from the solid portion of the waste stream. Once the hazardous constituent is extracted from the solid portion, the solid portion is generally considered non-hazardous and can be disposed of without further treatment in a conventional landfill.

Examples of such mixed-wastes include soils, inorganic adsorbents and other solids that are contaminated with hazardous organic or radioactive materials. Another such mixed waste consists of conventional and chemical munitions as well as munition dunnage. Protective suits, munition bodies and equipment contaminated with energetics, biological or chemical warfare agents is another mixed waste in which the solids portion could be disposed of conventionally if the hazardous contamination was removed and treated. Similarly, PCB contaminated transformers, pesticide contaminated bags and containers, and medical/biohazard waste such as contaminated needles and glass containers are all mixed wastes that could be disposed of efficiently by first separating the waste into hazardous and non-hazardous components.

Another category of waste that can pose difficulty for treatment by HTP is a concentrated acid, base or salt solution contaminated with an organic material. Treatment could be facilitated if the hazardous organic constituents could be separated for HTP while the residual inorganic solution could be handled by simpler means.

In the preceding examples, the organic to be treated may be a minor constituent or contaminant, or it may constitute a major portion of the feedstock.

In light of the above, it is an object of the present invention to provide methods suitable for the purposes of treating hazardous waste streams containing bulk solid materials and slurries that are difficult to size-reduce and pump to elevated pressure. It is another object of the present invention to provide methods for the removal and destruction of organic constituents from viscous materials such as bulk solids, sludges and slurries without having to pump the viscous material to high pressure. It is another object of the present invention to provide methods for the removal and destruction of organic constituents from acidic, alkaline, or salt-bearing waste streams or feedstocks. Yet another object of the present invention is to provide a method for chemically converting feedstocks containing solids using hydrothermal treatment which is robust, simple, and economical.

SUMMARY OF THE PREFERRED EMBODIMENTS

The present invention is directed to a system and method for treating feedstocks that include large solid objects, dissolved or undissolved solids, sludges or slurries that contain organics that may be volatilized. For the present invention, the feedstock is first fed into a desorption chamber to volatilize a portion of the feedstock and thereby separate the feedstock into a volatile portion and a residue portion. The feedstock can be continuously fed into the desorption chamber, or the feedstock can be introduced into the desorption chamber in batches. In the desorption chamber, the feedstock is heated to a temperature between approximately 300° F. and approximately 1500° F. and pressurized to a pressure of between approximately 20 atmospheres and approximately 200 atmospheres in an atmosphere that is overall net reducing.

In accordance with the present invention, steam, water or oxidants can be introduced into the desorption chamber to aid in the volatilization process. Specifically, these materials can be introduced to serve as reactants for localized partial oxidation and gasification reactions that assist in the overall volatilization of organic constituents. For the present invention, solids handling equipment can be installed in the desorption chamber to mix the steam with the feedstock and thereby increase the rate of volatilization. When continuous feed systems are employed, the solids handling equipment can also be utilized to transport the feedstock from the entrance to the exit of the desorption chamber. Examples of solids handling equipment that can be installed within the desorption chamber for use in conjunction with the present invention include augers, rotary kilns and drum or container breaching equipment.

Inside the desorption chamber, several mechanisms can be employed that operate alone or in combination to heat the feedstock. Sources of heat can include the use of conventional heating elements to heat the walls or solids handling equipment, the introduction of heated steam into the desorption chamber, and the heat generated from any exothermic reactions that occur in the desorption chamber.

From the desorption chamber, the volatile portion of the feedstock is transferred to a reactor for hydrothermal treatment, while the residue portion of the feedstock is removed from the desorption chamber for disposal. Preferably, a transfer pipe is used to establish fluid communication between the desorption chamber and the hydrothermal reactor to thereby transfer the volatile portion of the feedstock to the hydrothermal reactor. For the present invention, the volatile portion can be fed into a pipe reactor, downflow reactor or any other type of reactor suitable for hydrothermal treatment.

In the hydrothermal reactor, the volatile portion may be combined with an excess (20–100%) of oxidant and auxiliary fuel (if required). The reaction between the volatile portion, oxidant and auxiliary fuel is maintained at a temperature between approximately 1000° F. and approximately 1800° F. and a pressure of between approximately 20 atmospheres and approximately 200 atmospheres. The throughput of the reactor is controlled to cause the volatile portion of the feedstock to remain in the reactor for a sufficient residence time (10–60 seconds) to ensure complete oxidation of all organic species. After reaction, the effluent from the reactor can be further processed and then disposed.

Alternatively, addition of oxidant to the hydrothermal reactor may be reduced or eliminated, to allow organic reforming reactions to occur. Reactor temperature and pressure condition are again maintained at 1000–1800° F. and 20–200 atmospheres.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
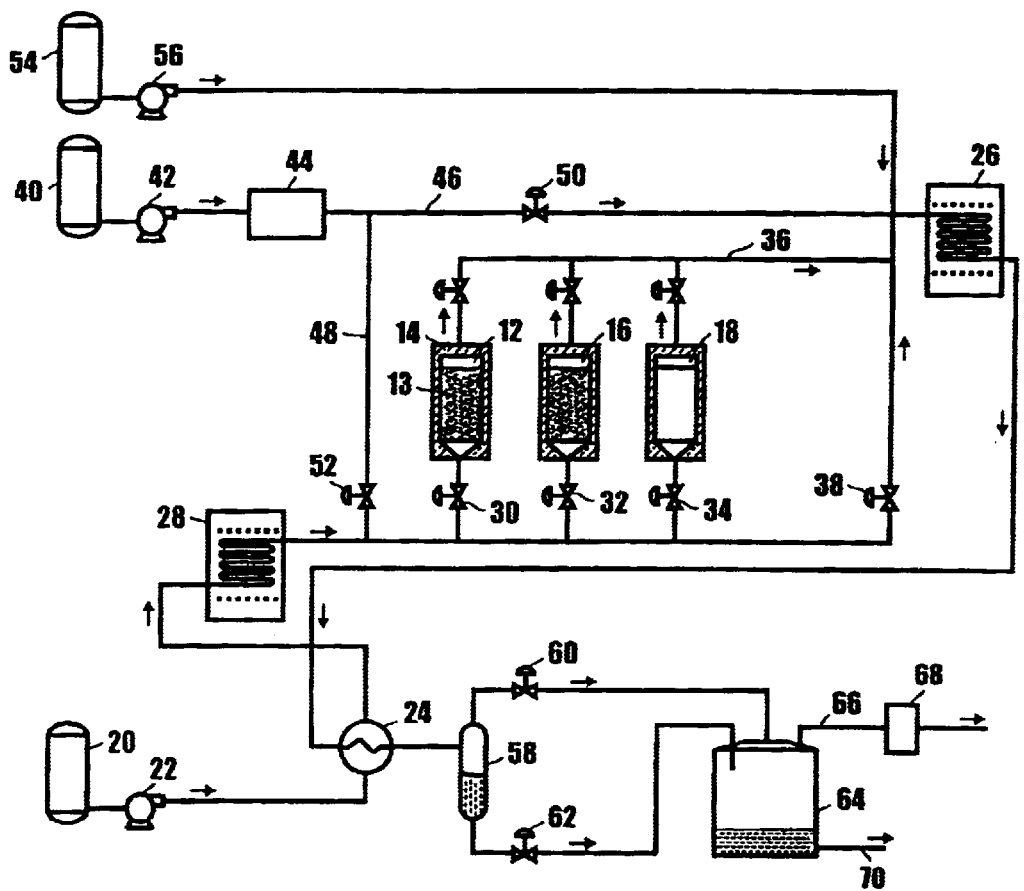
FIG. 1 is a schematic diagram of a system in accordance with the present invention having a batch desorption chamber and a pipe reactor.

Referring to FIG. 1, a system in accordance with the present invention is shown and generally designated 10. As shown in FIG. 1, the system 10 includes a desorption chamber 12 for volatilizing a portion of a feedstock 13. For the present invention, the feedstock 13 can be any material having a volatile component that can be separated from the remaining feedstock and oxidized or reformed hydrothermally. Specifically applicable for the present invention are feedstocks having a viscous component (i.e. a component such as a solid, slurry or sludge that is not readily processable directly into a hydrothermal reactor). The feedstock 13 will also be contaminated with or partially or wholly composed of a volatile component that is hydrothermally treatable. Although the volatile component will typically be organic, it is to be appreciated that feedstocks having a volatile inorganic component that can be oxidized in the hydrothermal reactor are also ideal candidates for the present invention. Also suitable for the present invention are feedstocks 13 having contaminated liquids with high dissolved inorganic content, such as dense brines, acids or bases. These liquid streams can cause problems when fed directly into a hydrothermal reactor due to excessive salt buildup or corrosivity in the reactor. With the present invention, the organic constituents of such streams may be volatilized at a relatively low temperature, where salt buildup or corrosion are not an issue.

As shown in FIG. 1, the desorption chamber 12 can be covered with insulation 14 to allow retention of process heat. Additional desorption chambers 16 and 18, similar to the desorption chamber 12, can be provided to allow at least one desorption chamber 12, 16, or 18 to be on line while the others are being loaded and unloaded with feedstock 13. Heaters (not shown) can be used to heat the feedstock 13 in the desorption chambers 12, 16, 18 to facilitate volatilization of a portion of the feedstock 13, at a typical operating temperature of 300–1500° F. Alternatively, steam can be introduced into desorption chambers 12, 16, 18 to heat the feedstock 13 and facilitate volatilization of a portion of the feedstock 13. As shown, water can be withdrawn from tank 20 and raised to the system operating pressure of 20–200 atm by high pressure pump 22. The pressurized water can be passed through a regenerative heat exchanger 24, which heats the water by heat exchange with hot reactor effluent from pipe reactor 26. Subsequent to the heat exchanger 24, additional heating of the steam may be accomplished in preheater 28. Preheat may be accomplished by an electrical heater as shown for preheater 28, by a fired heater, by a combination of these methods, or by other suitable means known in the art. The temperature of the steam leaving the preheater 28 is preferably in the range of 300–1500° F. It is to be appreciated that the temperature of the feedstock 13 can be elevated by heaters in the desorption chambers 12, 16, 18, the steam from preheater 28, or the steam and heaters in combination. Further, for some feedstocks 13, the heaters in the desorption chambers 12, 16, 18 can be employed during process startup and subsequently deactivated during steady state operation.

During operation of the system 10, steam from the preheater 28 can be directed through one of the valves 30, 32 or 34 and into one of the desorption chambers 12, 16 or 18 to volatilize a portion of the feedstock 13 and thereby create a volatile portion and a residue portion of the feedstock 13. The volatile portion combines with the steam and exits a desorption chamber 12, 16 or 18 into conduit 36 and flows toward pipe reactor 26. Additionally, as shown in FIG. 1, steam from the preheater 28 can be caused to bypass the desorption chambers 12, 16, 18 directly through valve 38 for use in the pipe reactor 26.

The volatile portion of feedstock 13 can be oxidized or reformed in the pipe reactor 26. To carry out the oxidation reaction, liquid oxygen (LOX) can be supplied from tank 40 and pressurized by the high pressure cryogenic pump 42. The pressurized liquid can be vaporized in vaporizer 44 and then passed to the reactor via line 46. Optionally, some oxygen may be supplied to the desorption chambers 12, 16, and 18 via line 48. In some cases, oxygen may improve the volatilization of the organics and the oxidation reaction can supplement the heat needed for volatilization in the desorption chamber 12, 16, 18. As shown, valves 50 and 52 can be used to split the oxygen between the desorption chamber 12, 16, 18 and the pipe reactor 26.

Referring still to FIG. 1, a supplementary fuel stream may be provided to pipe reactor 26 to attain reactor temperatures sufficient for high destruction efficiency of the volatile portion of the feedstock 13. Generally, the heating value of the steam with the volatile portion of the feedstock 13 is low, necessitating supplementary fuel. As shown in FIG. 1, supplementary fuel can be supplied from tank 54 and pumped to the pipe reactor 26 by high pressure pump 56. The fuel, oxidant, steam, and volatile portion of feedstock 13 mix at the head of the pipe reactor 26. Within the pipe reactor 26, temperatures as high as 1800° F. are attained due to heat liberated by the oxidation reactions. Preferably, the temperature within the pipe reactor 26 is maintained between approximately 1000° F. and approximately 1800° F. and the pressure within the pipe reactor 26 is maintained between approximately 20 atmospheres and approximately 200 atmospheres. Feed rates of supplementary fuel, oxidant, and steam may be varied to accommodate varying concentrations of the volatile portion of feedstock 13 that may be entering the pipe reactor 26. Residence time in the pipe reactor 26 is typically less than 30 seconds.

The reaction in the pipe reactor 26 creates a hot effluent that exits the pipe reactor 26 and is fed to a regenerative heat exchanger 24 for cooling. The resulting cool, high pressure stream can then be separated into liquid and gaseous streams in a separator 58. Preferably, the gas and liquid are depressurized separately through valves 60 and 62, respectively. The use of separate depressurization of the gas and liquid streams helps to minimize erosion of the pressure letdown valves 60 and 62.

The depressurized gas and liquid can be fed to a collection tank 64, as shown in FIG. 1. From the collection tank 64, the gas is passed to atmosphere through line 66. If desired, a sampling port (not shown) can be installed in line 66. If required, a carbon filter 68 can be installed in line 66 to remove any unoxidized organic material in the gas. The liquid from collection tank 64 may be sampled, released, or otherwise collected through line 70.

Figure 2:
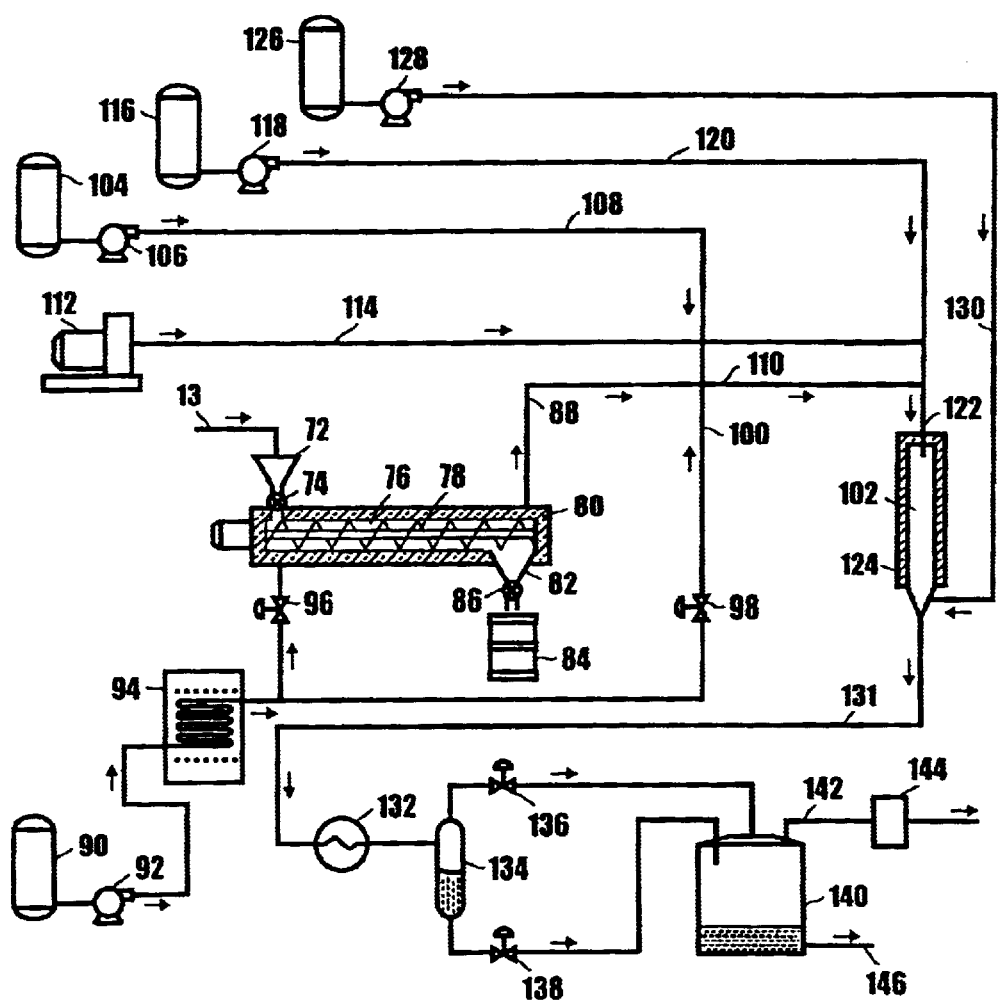
FIG. 2 is a schematic diagram of a system in accordance with the present invention having a continuous desorption chamber and a vessel reactor.

Referring now to FIG. 2, an alternative embodiment of the present invention is shown. In this embodiment, contaminated feedstock 13, as described above, can be fed into a lockhopper 72. The feedstock 13 can be added to lockhopper 72 as a single batch, or added in a continuous or semicontinuous fashion. Lockhopper valve 74 is provided to intermittently introduce a portion of the feedstock 13 from the lockhopper 72 and into the head of the pressurized desorption chamber 76. It is to be appreciated that lockhopper valve 74 operates as an airlock, allowing the pressure within the desorption chamber 76 to be maintained while feedstock 13 is introduced.

As shown in FIG. 2, an auger 78 can be installed in the desorption chamber 76 to move the feedstock 13 through the desorption chamber 76. The wall of the desorption chamber 76 and/or the auger 78 can be heated to elevate the temperature of the feedstock 13 to a temperature of between approximately 300° F. and approximately 1500° F. Alternatively, a rotating drum (not shown) can be installed in the desorption chamber 76 to move and mix the feedstock 13 with the steam. For the present invention, it is contemplated that drums full of material may be used as a feedstock 13. In this case, a pusher-feeder (not shown) may be installed in the desorption chamber 76 for manipulating the drums or other similar containers. Further, the pressure applied in the desorption chamber 76 can be used to crush and rupture closed containers such as drums, thus allowing any contained material to be exposed within the desorption chamber 76 for volatilization. Likewise, the container contents may expand due to the temperature in the desorption chamber 76, causing container expansion and rupture and allowing exposure of the container contents. Alternatively, an in-situ breaching device (not shown) may be installed within the feed lockhopper 72 to expose the material in containers before insertion into the desorption chamber 76. In this manner, volatiles can be released without overpressuring the closed container in the desorption chamber 76. This allows the shape of the container to be maintained while being transported through the desorption chamber 76.

As shown in FIG. 2, the desorption chamber 76 can be covered with insulation 80 to help retain the elevated operating temperature. In the course of traversing the desorption chamber 76, the volatile portion of the feedstock 13 (which generally consists of organic constituents and moisture) are volatilized due to the elevated operating temperature. The volatilization of the feedstock 13 results in a residue portion which is generally a viscous material such as a solid, sludge or slurry and a volatile portion. At the tail end of desorption chamber 76, the residue portion can be transferred into lockhopper 82. Lockhopper valve 86 is provided to intermittently discharge the residue portion into a collection drum 84. It is to be appreciated that lockhopper valve 86 can be constructed to operate as an airlock, allowing the pressure within desorption chamber 76 to be maintained during discharge of the residue portion. The volatile portion which generally consists of volatilized organics and moisture exits the desorption chamber 76 via line 88.

Referring still to FIG. 2, steam can be introduced into the desorption chamber 76 to heat the feedstock 13 and facilitate desorption. As shown, water from tank 90 can be withdrawn and raised to the system operating pressure of between approximately 20 atmospheres and 200 atmospheres by high pressure pump 92. The pressurized water can be passed through preheater 94 and raised to a temperature between approximately 300° F. and approximately 1500° F. Preheat may be accomplished by an electrical heater such as preheater 94, by a fired heater, by a combination of these methods, or by other suitable means known in the art. Preheater 94 is also used to heat the desorption chamber 76 during startup from a cold condition.

During operation, steam from the preheater 94 can be directed through valve 96 and into the desorption chamber 76 for interaction with the feedstock 13. As shown in FIG. 2, the feedstock 13 and steam are introduced at the same end of the desorption chamber 76 and subsequently flow within the desorption chamber 76 in the same direction (i.e. the feedstock 13 and steam are in co-current flow). In some implementations of the present invention, the steam and feedstocks 13 can be introduced at opposite ends of the desorption chamber 76 causing the feedstock 13 and steam to flow in opposite directions (i.e., countercurrent flow). Countercurrent flow can result in the production of a cleaner residue portion for some feedstocks 13. Additionally, steam from the preheater 94 can be allowed to bypass the desorption chamber 76 through line 100 using valve 98. The bypass steam flowing through line 100 can be introduced into reactor 102 for use in controlling the temperature within the reactor 102.

Referring still to FIG. 2, a supplementary fuel stream may be provided for introduction into reactor 102 to attain reactor temperatures sufficient for high destruction efficiency of the volatilized organics in the volatile portion of the feedstock 13. Generally, the heating value of the steam with the entrained organics in line 88 is low. As shown in FIG. 2, supplementary fuel can be supplied from tank 104 and pumped to the reactor 102 by high pressure pump 106. From the pump 106, the supplementary fuel passes through line 108 for mixture with the volatile portion of the feedstock 13 and steam from line 88 and the optional steam from line 100. The mixed stream enters line 110 and proceeds toward the reactor 102.

Regardless of whether the volatile portion of the feedstock 13 is to be completely oxidized or only reformed in vessel reactor 102, an oxidant may be required. For the present invention, the oxidant used can be oxygen as described above, air, enriched air or any other oxidant known in the pertinent art such as hydrogen peroxide. As shown in FIG. 2, ambient air can be compressed to high pressure using a high pressure air compressor 112. From the compressor 112, the air enters line 114 and proceeds toward the reactor 102. In addition, it is sometimes desirable to add alkali to the reactor 102 to neutralize acidic constituents such as hydrogen chloride or sulfuric acid that can be formed when organic material containing heteroatoms is oxidized. FIG. 2 shows alkali supply tank 116, from which alkali such as sodium hydroxide solution can be introduced to the process via high pressure pump 118. From the pump 118, the alkali solution can be passed through line 120, mixing with air from line 114 and the volatile portion of feedstock 13/steam mixture from line 110. The mixed stream then enters the reactor 102 via line 122. The order of mixing the various feeds to the reactor 102 can vary depending on feed. In some cases, the streams can be mixed before entering the main reactor 102.

Feed rates of supplementary fuel, oxidant, and steam may be varied to accommodate varying concentrations of organics or other oxidizable materials in the volatile portion of the feedstock 13 that is entering the reactor 102. Alternatively, a control device such as a hot valve (not shown) may be incorporated to regulate the flow of volatiles from the desorption chamber 76 to the reactor 102 to aid steady reactor operation. In another embodiment of the present invention, a control circuit (not shown) can be used to vary either the temperature within the desorption chamber 76 or the feed rate that feedstock 13 is introduced in the desorption chamber 76. Specifically, a control circuit can be employed to vary the heating rate or feed rate in response to the measured flow rate of volatiles entering the reactor 102.

As shown in FIG. 2, the reactor 102 can be covered with insulation 124 to help preserve the heat of reaction and achieve a high degree of oxidation. For the present invention, the reactor 102 may be of the type described in U.S. Pat. No. 6,054,057 to Hazlebeck, et al., entitled "Downflow Hydrothermal Oxidation," and which is assigned to the same assignee as the present invention. As described in the '057 patent, it is sometimes desirable to introduce a quench stream at the bottom of the reactor 102 to cool the reaction stream and dissolve any salts that may have formed in the reactor 102. In FIG. 2, quench water can be supplied to the reactor 102 from tank 126 via high pressure pump 128 and line 130. For the present invention, a scraper device (not shown) can be installed in the reactor 102 to mitigate deposition of solids on the inner wall of the reactor 102. Alternatively, a mechanical device such as an auger (not shown) can be installed in the reactor 102 to aid solids removal from the reactor 102.

In operation, the heat created by the oxidation reaction is often sufficient to maintain the temperature in the reactor 102 at the desired operation level, which is between approximately 1000° F. and approximately 1800° F. The feed rates into and out of the reactor 102 can be adjusted to obtain a desired residence time in the reactor 102 which is typically less than 30 seconds. In the reactor 102, the intimate gas-liquid contact ensures that emissions of particulates, acid gases and metals are within the most stringent environmental regulations. Because of the rapid internal thermal quench, dioxins, difurans and other typical byproducts of conventional waste oxidation are not formed in the well-mixed HTO reactor. The feed rates and operating conditions in the reactor 102 can be adjusted to completely oxidize the volatile portion of the feedstock 13 or reform it into a fuel gas or synthesis gas. For reformation, substoichiometric or no oxygen is added to the feedstock 13 at the reactor 102, allowing the organics to reform. Operating pressures for gasification are similar to those used for complete oxidation, however, preferred gasification temperatures can range somewhat higher than those used for oxidation, for example as high as 1800° F.

As shown in FIG. 2, a heat exchanger 132 is provided to cool the effluent exiting the reactor 102 through line 131. Although a quench stream is preferably used in the reactor 102, the quenched effluent may still exit the reactor 102 at a temperature of approximately 500° F. The cool, high pressure stream that exits from the heat exchanger 132 is forwarded to a separator 134 for separation into liquid and gaseous streams. The gas and liquid streams are depressurized separately through valves 136 and 138, respectively. This technique of separate depressurization of the gas and liquid streams helps to minimize erosion of the pressure letdown valves 136 and 138.

As shown in FIG. 2, the depressurized gas and liquid streams proceed from the letdown valves 136, 138 and into a collection tank 140. From the collection tank 140, the gas fraction passes through line 142, and may be sampled if desired. An optional carbon filter 144 can be provided in line 142 to remove unoxidized organic material, if required. Optionally, a mechanism (not shown) for removing and liquefying carbon dioxide from the gas can be installed in line 142 to reduce greenhouse gas emissions. The liquid from collection tank 140 may be sampled, released, or otherwise collected through line 146. If required, a mechanism (not shown) for polishing the liquid effluent can be installed in line 146 to remove dissolved or particulate metals.

As an alternative to the designs shown in FIGS. 1 and 2, it is also possible to use a single pressure vessel with two zones, one zone for volatilization and a second for oxidation or reforming. For example, a container having a screened opening can be used to hold the feedstock. The container can be placed inside a pressure vessel. Volatiles released from the container can be oxidized or reformed in the remaining portion of the pressure vessel.

While the particular devices and methods as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A method for treating material, said method comprising the steps of:

heating and pressurizing the material to a temperature between approximately 705° F. and approximately 1500° F. and a pressure of between approximately 20 atmospheres and approximately 200 atmospheres in a first chamber;

retaining said material in said first chamber at said temperature, said pressure and in an atmosphere that is overall net reducing to volatilize a portion of said material;

transferring said volatilized portion to a second chamber;

adding oxidant to said second chamber; and oxidizing said volatilized portion in said second chamber at a temperature between approximately 1000° F. and approximately 1800° F. and a pressure of between approximately 20 atmospheres and approximately 200 atmospheres.

2. The method as recited in claim 1 wherein the step of heating and pressurizing the material in a first chamber comprises injecting steam into said first chamber.

3. The method as recited in claim 1 further comprising the step of injecting steam into said second chamber.

4. The method as recited in claim 1 wherein said oxidizing step produces a process effluent containing carbon dioxide and said method further comprises the step of separating a portion of said carbon dioxide from said process effluent.

5. The method as recited in claim 4 further comprising the step of liquefying said separated carbon dioxide.

6. The method as recited in claim 1 further comprising the step of using an auger in said first chamber to mix and transport the material within said first chamber during said retaining step.

7. The method as recited in claim 1 wherein said first chamber and said second chamber are located within separate pressure vessels.

8. The method as recited in claim 1 wherein said first chamber and said second chamber are located within a single pressure vessel.

* * * * *